United States Patent
Kikuchi (10) Patent No.: US 7,324,140 B2
(45) Date of Patent: Jan. 29, 2008

(54) IMAGE PICK-UP APPARATUS HAVING DATA LOSS PREVENTION FUNCTION FOR INTERNAL MEMORY

(75) Inventor: Hiroshi Kikuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/400,482

(22) Filed: Mar. 28, 2003

(65) Prior Publication Data

US 2003/0185547 A1 Oct. 2, 2003

(30) Foreign Application Priority Data

Apr. 2, 2002 (JP) ............................. 2002-100232

(51) Int. Cl.
*H04N 5/76* (2006.01)
(52) U.S. Cl. .................. 348/231.7; 348/231.9
(58) Field of Classification Search ........... 348/231.99, 348/231.7, 231.9, 372, 231.1, 231.6, 207.1; 396/321, 129, 205, 301, 303, 277–280; 358/906, 358/909.1
See application file for complete search history.

(56) References Cited

U.S. PATENT DOCUMENTS

| | | | | |
|---|---|---|---|---|
| 5,563,396 A | * | 10/1996 | Wakui | 235/441 |
| 5,633,678 A | * | 5/1997 | Parulski et al. | 348/231.5 |
| 6,549,232 B1 | * | 4/2003 | Taniguchi et al. | 348/231.99 |
| 6,590,614 B1 | * | 7/2003 | Nishio et al. | 348/374 |
| 6,631,427 B2 | | 10/2003 | Kubo | 710/17 |
| 7,095,437 B1 | * | 8/2006 | Hatakeyama | 348/231.7 |
| 2002/0030845 A1 | * | 3/2002 | Takahashi | 358/1.15 |
| 2002/0093575 A1 | * | 7/2002 | Kusaka | 348/233 |
| 2002/0140846 A1 | * | 10/2002 | Cheung | 348/372 |
| 2003/0011690 A1 | * | 1/2003 | Uryu | 348/231.7 |

FOREIGN PATENT DOCUMENTS

| | | |
|---|---|---|
| JP | 11-88818 | 3/1999 |
| JP | 2000-152139 | * 5/2000 |
| JP | 2000-278577 | * 10/2000 |

* cited by examiner

*Primary Examiner*—Lin Ye
*Assistant Examiner*—Yogesh Aggarwal
(74) *Attorney, Agent, or Firm*—Fitzpatrick, Cella, Harper & Scinto (57) ABSTRACT

When it is ascertained that continuous photography has been terminated, the recording to an external recording medium, via an image recording circuit, of image data stored in an internal memory is initiated. When an instruction is issued to start the recording of data onto the external recording medium, the state of a protection cover detection switch is detected. When the detection result of the protection cover detection switch indicates the protection cover is open, the recording of the image data onto the external recording medium is halted, and data stored in the external recording medium are protected. While when image data is still present in the internal memory, the conductive state of the internal memory is maintained following the halting of the data recording performed for the external recording medium, so that the loss of the image data in the internal memory is prevented.

8 Claims, 5 Drawing Sheets

IMAGE PICK-UP APPARATUS HAVING DATA LOSS PREVENTION FUNCTION FOR INTERNAL MEMORY

BACKGROUND OF THE INVENTION

1. Field of the Invention

The present invention relates to an image pickup apparatus, such as a digital still or video camera, that compresses digital image data and records the compressed image data to a recording medium.

2. Related Background Art

Conventionally, a digital camera is generally known wherein the image of an object acquired through an image pickup lens is photoelectrically converted with an image pickup element such as a CCD, and A/D conversion is performed on the obtained image signal to record the resultant image data onto a recording medium. In this camera, image data is temporarily stored in a buffer memory, and thereafter, are transferred to and stored into an external recording medium, such as a compact flash (R) card (a CF card) or a hard disk, that is detachably attached to the main body of the camera.

Recently, for images obtained by a digital camera, the need has arisen for the improved image quality available with higher resolutions, and this has resulted in an increase in the number of pixels of an image pickup element. Accordingly, the image data volume has increased, and extending the data processing period, i.e., increasing the intervals for photographing and recording, has become a problem, and could cause a user to miss a good opportunity for a photograph.

To avoid such a problem, a camera has been proposed wherein when image data is obtained it is temporarily stored in a built-in buffer memory, and wherein when the next photographic instruction is received while the temporarily stored image data is being transferred to and recorded onto an external recording medium, the recording operation is halted so that to the maximum extent possible, the photographic process is performed preferentially in accordance with the remaining capacity of the buffer memory.

When the taking of a photograph has been completed, the recording onto the external storage medium of the temporarily stored image data is resumed. For this purpose, to notify a user that image data is being recorded, a camera is generally so designed that the recording of data onto the external recording medium is indicated by blinking an LED. Further, a camera in which a large buffer memory is mounted is superior because photographs can be taken quickly, at an opportune timing. Since an enormous amount of data are collectively transferred from the buffer memory to an external recording medium. the recording period may be extended. Therefore. during this recording period. the external recording medium and a power source battery must remain being attached; however, while the recording period is being extended. there is an increasing probability that the external recording medium or the power source battery will be carelessly and erroneously removed.

According to a digital camera disclosed in JP-A-2000-278577, while first priority is given to the photography operation and second priority is given to the recording operation, other operations, i.e., the switching off of a power switch and the image reproduction operation, are initiated after the data recording for an external recording medium has been completed. Further, when data is being stored in the buffer memory provided as the temporarily storage of image data, a reduction in the power source voltage or the sudden removal of an external recording medium or a battery generates an alarm to alert a user to the recording state of the external recording medium.

Further, as is disclosed in JP-A-2000-152139, a mechanism is provided that, when the camera is set in the photography-enabled state, the removal of an external recording medium is inhibited.

However, when the external recording medium or the battery is abruptly removed while the data in the buffer memory is being recorded onto the external recording medium, a data management file in the external recording medium is not recorded, and thus the image data that have been recorded can not be read out. Therefore, as is disclosed in JP-A-2000-278577, no problem will occur so long as the external recording medium is not removed or the battery power is maintained during a period after which the operation is shifted to one other than the photography. But even when an alarm is generated upon the removal of an external recording medium or a battery, it is then too late to protect recorded data, and further, when it is the battery that is removed, there is a high probability that data remaining in the buffer memory will be lost or data recorded onto the external recording medium will be destroyed.

However, since according to the camera disclosed in JP-A-2000-152139 a removal inhibition mechanism that operates synchronously with a turn-on power switch is required to prevent the negligent removal of an external recording medium, the manufacturing costs will be increased.

Therefore, the objectives of the present invention are the prevention of an increase in the manufacturing costs, and the improved maintenance of the image data recording condition, to ensure that image data temporarily stored in the internal memory of a camera are not lost due to a user error and to enable the later recording of data to an external recording medium.

SUMMARY OF THE INVENTION

It is one objective of the present invention to provide an image pickup apparatus that can save an image data recording condition to ensure that image data temporarily stored in the internal memory of the image pickup apparatus will not be lost due to a user error and the image data can be recorded onto the external recording medium later.

To achieve this objective, according to one aspect of the present invention, an image pickup apparatus of the present invention comprises:

an internal memory which stores image data obtained by image pickup means for converting an image of an object into an electrical signal;

recording means for sequentially recording the image data stored in the internal memory onto an external recording medium;

detection means for detecting shifting of an operating member related to the performance of a data recording operation;

recording control means for controlling data recording onto the external recording medium on the basis of a detection result obtained by the detection means; and memory discrimination means for discriminating whether image data to be recorded onto the external recording medium still exists in the internal memory, wherein, when image data to be recorded onto the external recording medium exists in the internal memory and the shifting of the operating member is detected by the detection means, the recording control means provides an instruction to halt the data recording operation for the external recording medium, and continues to maintain the image data stored in the internal memory.

Other aspects of the invention will become apparent during the course of the following descriptions given for the preferred embodiments.

BRIEF DESCRIPTION OF THE DRAWINGS

FIG. 2 is comprised of FIGS. 2A and 2B showing flowcharts illustrating the processing performed by the digital still camera according to the first embodiment of the present invention;

DETAILED DESCRIPTION OF THE PREFERRED EMBODIMENTS

The preferred embodiments of the present invention will now be described in detail while referring to the accompanying drawings.

First, an explanation will be given for a first embodiment of the present invention.

Figure 1:
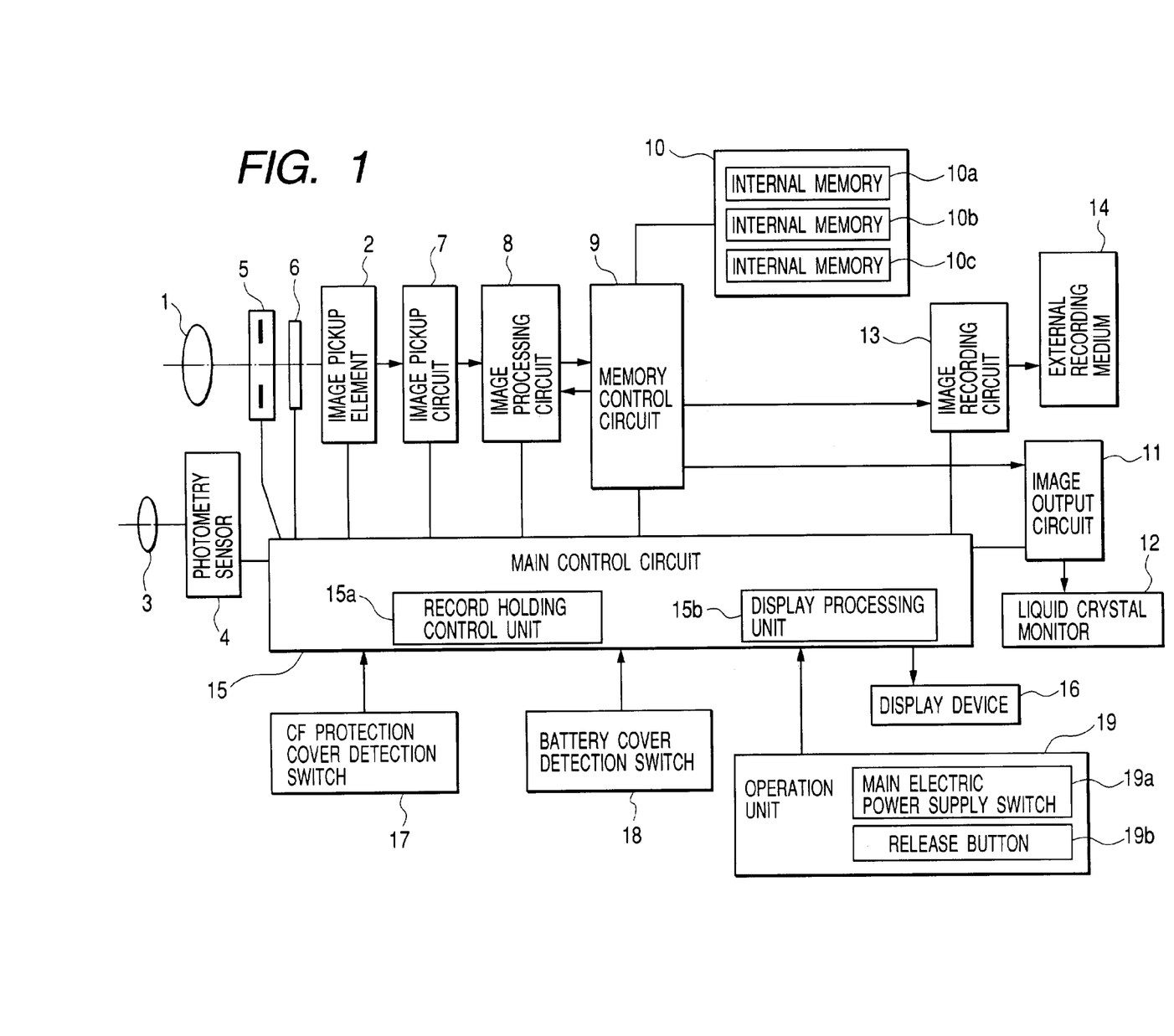
FIG. 1 is a block diagram showing the basic structure of a digital still camera according to a first embodiment of the present invention.

FIG. 1 is a block diagram showing the basic configuration of a digital still camera according to the first embodiment of the present invention. The digital still camera in this embodiment is so arranged that an output video signal is transmitted to a built-in liquid crystal monitor and a photographed image is reproduced on the monitor screen.

In FIG. 1, an image of an object is focused onto an image pickup element 2, such as a CCD, through an image pickup lens 1. A lens 3 is used for photometry, and a photometry sensor 4 is, for example, an SPC. And an aperture 5 and a shutter 6 are operated to determine an exposure amount for the image pickup element 2.

An image pickup circuit 7 samples a signal output from the image pickup element 2, and performs an A/D conversion of an image pickup signal and amplification thereof. And an image processing circuit 8 performs a number of predetermined processes, such as white balance, exposure adjustment and y correction, on R, G and B image signals output from the image pickup element 2.

An internal memory 10, which functions as a temporary image data storage buffer, is divided into memory areas 10a, 10b and 10c. The internal memory is constituted by volatile memory, such as DRAM, whose data transfer rates are high and whose power consumption is low, and has adequate capacity for the storage of a predetermined number of static pictures. A memory control circuit 9 manages the data stored in the internal memory 10, i.e., determines in which of the memory areas 10a, 10b and 10c data should be stored and from which of the memory areas 110a, 10b and 10c data should be extracted. Further, to synthesize multiple images, the memory control circuit 9 performs a thinning-out process (a reduction in the size of an image) for image data, and an address control process for the image data subjected to the thinning-out process.

An image output circuit 11 converts a digital image signal received from the memory control circuit 9 into an analog signal, and also serves as an output buffer for a liquid crystal monitor 12. An image recording circuit 13 functions as a data input/output interface for the transmission to an external recording medium 14 of image data extracted from the internal memory 10. Image data, especially those obtained by continuous photography, are sequentially stored, at high speed, into the internal memory 10, and thereafter are recorded onto the external recording medium 14 via the image recording circuit 13. However, the data transfer speed at this stage is slow, so that even after the continuous photographing is terminated, time is further required to record the image data onto the external recording medium 14. It should again be noted that the external recording medium 14 is a detachable recording medium, such as a compact flash (R) card (CF card).

A main control circuit 15, including a microcomputer that provides overall control for the processing sequence, controls the individual components related to the detection of switch statuses, image pickup and image reproduction and the recording processes. A record holding control unit 15a provides power control, via the memory control circuit 9, for the internal memory 10, and performs control of retention of recording and deletion of image data stored in the internal memory 10. And a display processor 15b supplies instructions for the display of the setup of a photography mode and the generation of an alarm provided by the camera.

A display device 16 is a liquid crystal display device or a loudspeaker, which, based on instructions issued by the display processor 15b, uses characters or tones to notify a user of the operating state. A protective cover detection switch 17 is used to detect the open and closed positions of a recording medium protective cover, provided to cover an entrance of the medium insertion slot of a recording medium chamber wherein the external recording medium 14 is loaded. And an operation unit 19 is employed by a user to enter various camera commands, while a main electric power supply switch 19a is used to activate the camera and a release button 19b is used to start the photography operation.

Figures 2, 2A:
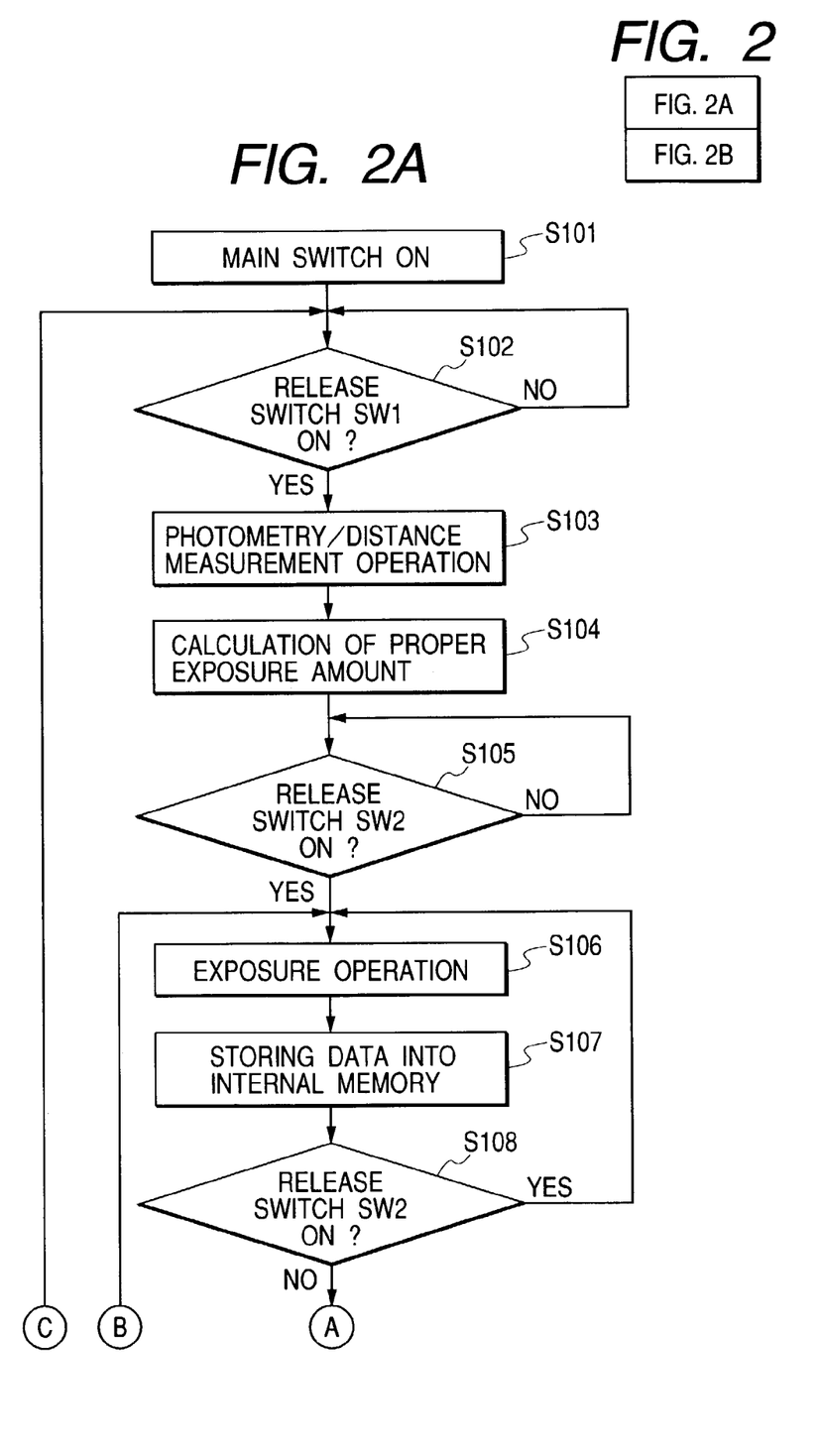
Figure 2B:
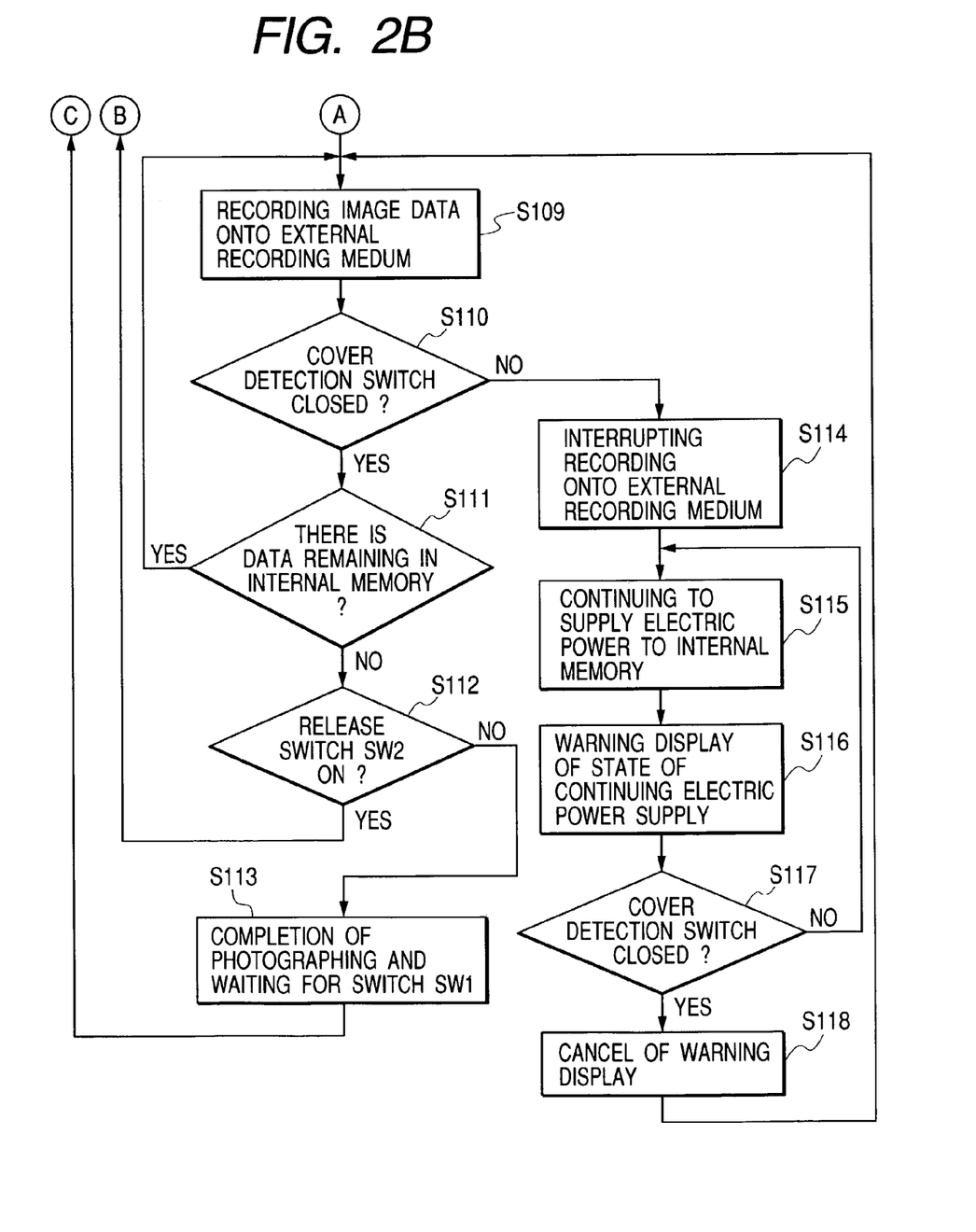

FIGS. 2A and 2B are flowcharts showing the processing performed by the digital still camera according to the embodiment. In this embodiment, of the various digital camera functions, special attention will be given to the one for the photography mode.

When the main electric power supply switch 19b of the digital still camera is turned on, the photography-enabled state, i.e., the standby state for waiting for the next operation, is set (step S101). Thereafter, the main control circuit 15 constantly monitors changes in the states of the switches that synchronizes with the depression of the release button 19b (step S102).

When the release button 19b is depressed to the first stroke stage, a switch SW1 is turned on and the photometry sensor 4 detects the light amount of an object. Then, using the photometry value data that is detected, the microcomputer of the main control circuit calculates the correct exposure time (steps S103 and S 104). Thereafter, a switch SW2 is turned on at the second stroke stage of the release button 19b, the aperture 5 and the shutter 6 are operated by reflecting, at the appropriate exposure timing, exposure correction in accord intended by the photographer, and the exposure operation for the image pickup element 2 is initiated (step S106).

During the exposure operation, a signal output from the image pickup element 2 is sampled and amplified by the image pickup circuit 7, and predetermined image data is generated by the image processing circuit 8 and stored in the internal memory 10 via the memory control circuit 9 (step S107).

The status of the switch that synchronizes with the depression of the release button 19*b* is again detected (step S108). And when the switch SW2 remains to be turned on at the second stroke stage of the release button 19*b*, it is assumed that the continuous photography mode is set, and thus the operation is again immediately shifted to the exposure operation, without any data transmission to the image recording circuit 13 being performed.

When the turning-off of the switch SW2 is detected, it is assumed that the continuous photography has been terminated, and thus the recording onto the external recording medium 14 of the image data stored in the internal memory 10 is begun via the image recording circuit 13 (step S109). At this time, the image data to be recorded onto the external recording medium 14 is temporarily stored in the internal memory 10.

Once the instruction is issued to begin recording data onto the external recording medium 14, the status of the protection cover detection switch 17 is detected to determine the open/closed state of the recording medium protection cover (step S110).

First, an explanation will be given for the processing performed when it is detected at step S110 that the protection cover detection switch 17 is closed. When it is thus ascertained that the recording medium protection cover is closed, the recording of image data onto the external recording medium 14 is continued until all the image data stored in the internal memory 10 is recorded. The transfer and recording of the image data is performed sequentially, frame by frame, and once all the image data of a frame is transferred and recorded onto the external recording medium 14, the data for that frame is erased from the internal memory 10. The process for managing the frame count for the images present in the internal memory 10, and the process for erasing the image data, performed when the image data is recorded onto the external recording medium 14, are executed, based on an instruction issued by the record holding control unit 15*a*.

Since the image data in the internal memory 10 are sequentially erased as they are recorded on the external recording medium 14, a check is repeatedly performed to determine whether there are image data remaining in the internal memory 10, and so long as there are, the recording operation for the external recording medium 14 is continued (step S111). During this recording operation, the status of the protection cover detection switch 17 is monitored constantly, and an interrupt is issued whenever the status of the protection cover detection switch 17 indicates the protection cover is open (steps S109 to S111).

When it is ascertained that no image data remain in the internal memory 10, it is assumed that all the image data stored in the internal memory 10 are transferred and recorded onto the external recording medium 14, and thus program control is shifted to prepare for the next photography process. At this time, the recording operation may be completely terminated, based on a determination that no image data remain in the internal memory, and the reception of a recording end signal from the external recording medium 14.

When, as preparation for the next photography process, the switch SW2 is turned on at the second stroke stage of the release button 19*b*, the photography operation is again initiated. However, when the switch SW2 is not turned on, program control is shifted to the wait mode to await the turning on of the switch SW1 at the first stroke stage of the release button 19*b* (steps S112 and S113).

An explanation will now be given for the case wherein at step S110 the protection cover is open and its state is detected by the protection cover detection switch 17. This explanation, of course, also applies to a case wherein the protection cover detection switch 17 detects open of the cover while the recording operation (transfer operation) for the external recording medium 14 is being performed. In this case, although image data to be recorded onto the external recording medium 14 is still present in the internal memory 10, a user will have erroneously opened the recording medium protection cover. That is, this means that the external recording medium 14 has been removed anyway. In this case, only the minimum information, such as a data management file, is recorded onto the external recording medium 14, and the access operation, performed between the camera and the external recording medium 14, is terminated. That is, the recording of image data onto the external recording medium 14 is halted to protect data that have already been recorded onto the external recording medium 14 (step S114).

When the recording operation for the external recording medium 14 is halted, the supply of electric power to the image recording circuit 13 and the external recording medium 14 is also halted. However, when the recording is halted, data to be recorded onto the external recording medium 14 remains in the internal memory 10. Thus, when all the components, including the image recording circuit 13 and the external recording medium 14, are powered off, the image data remaining in the internal memory 10, which is volatile memory, will be lost as time elapses.

Therefore, in case that image data remains in the internal memory 10, the supply of power to the internal memory 10 is continued, even after the recording operation for the external recording medium 14 is halted, so that the image data in the internal memory 10 will not be lost and can be retained (step S115). The supply of electric power to the internal memory 10 is performed based on an instruction issued by the record holding control unit 15*a*.

In order to notify a user that electric power continues to be supplied to the internal memory 10, a warning display instruction is issued by the display processing unit 15*b* and a warning is displayed on the display device 16, which is, for example, a liquid crystal display device (step S116).

In a period during which electric power is continuously supplied to the internal memory 10, the camera consumes more power than in the normal photography standby state. The warning, therefore, is used to notify the user that power is being wasted, and that the recording medium protection cover should be closed immediately so that the image data in the internal memory 10 can be transferred and recorded onto the external recording medium 14.

After the warning is displayed, checks are performed to determine whether, in response to the displayed warning, the user has closed the recording medium protection cover (step S117). Until the closing of the recording medium protection cover is detected, the supply of electric power to the internal memory 10 is continued to save the image data stored therein; but once the closing of the recording medium protection cover is detected, the warning display is canceled (step S118) and the transfer and the recording, onto the external recording medium 14, of the image data remaining in the internal memory 10 is resumed (step S109).

Figure 3:
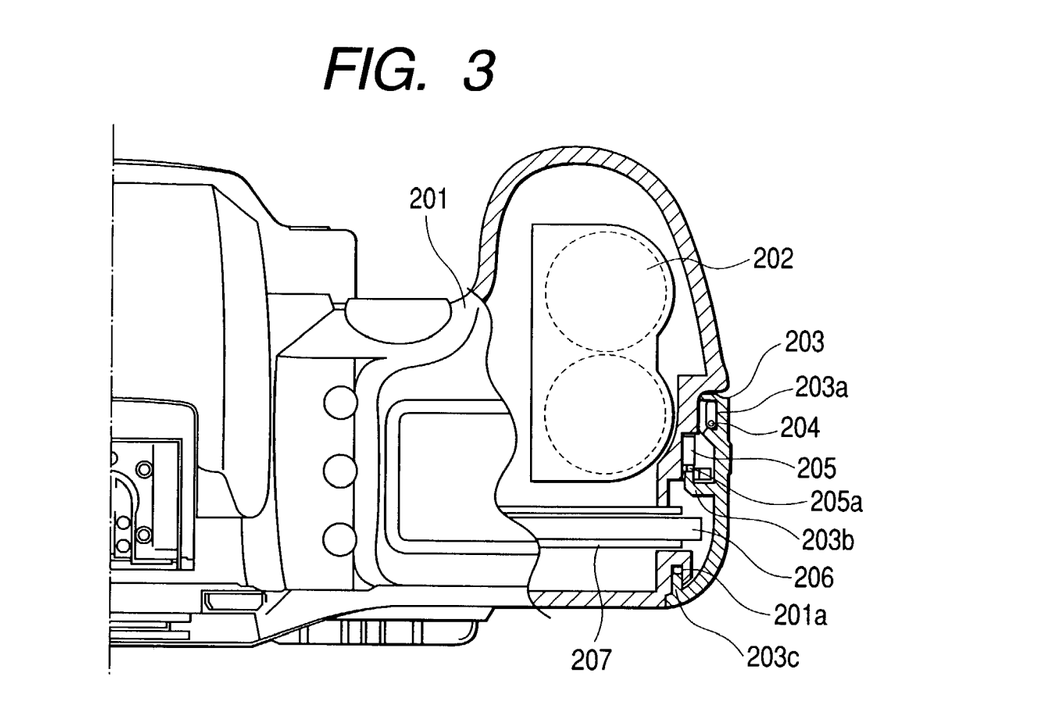
FIG. 3 is a top view of the right half of the digital still camera according to the first embodiment of the present invention.
Figure 4:
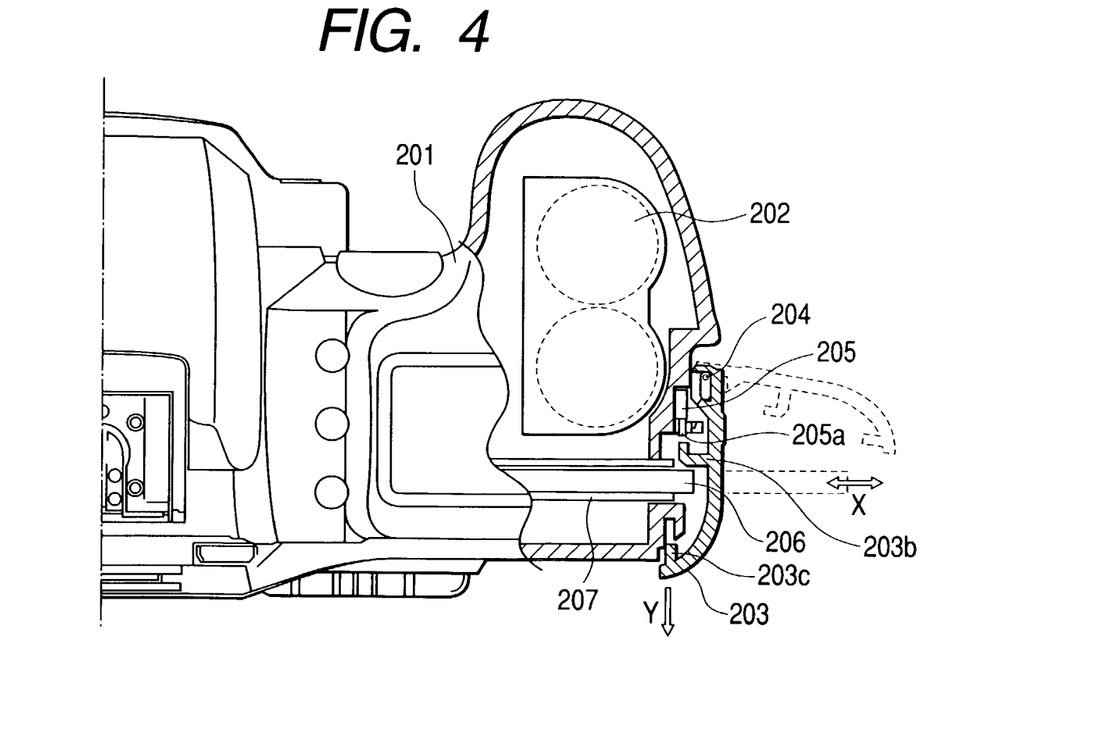
FIG. 4 is a diagram showing the state wherein the processing is shifted to an operation for opening a recording medium protection cover.

FIGS. 3 and 4 are top views of the right half of the digital still camera according to the present invention, and show a partial cross section of the grip. The peripheral structure of the recording medium protection cover will now be described while referring to FIGS. 3 and 4. In FIG. 3 the recording medium protection cover is closed, and in FIG. 4 the opening of the recording medium protection cover is begun.

The grip and the rear portion of a camera main body 201 in the cross-sectional view are respectively shaded and hatched. Batteries 202, detachable from the camera main body 201, are located within the open space in the grip. A recording medium protection cover 203 is rotatably supported by a hinge shaft 204 that is fixed the camera main body 201. While a bearing portion 203a of the recording medium protection cover 203 is a long hole extended toward the front and the rear of the camera and arranged movably slightly forward and rearward.

A protection cover detection switch 205 corresponds to the protection cover detection switch 17 in the block diagram in FIG. 1. When the recording medium protection cover 203 is closed, a moving shaft 205a of the protection cover detection switch 205 is driven forward by an arm 203b of the recording medium protection cover 203. A compact flash (R) card 206, which is detachable from the camera main body 201, corresponds onto the external recording medium 14 in the block diagram in FIG. 1 and is inserted into a card slot 207.

The operation performed when the recording medium card 206 in FIG. 3 is extracted from the camera main body 201 will now be explained. First, in the closed state, the user of the camera moves the entire recording medium protection cover 203 to the rear (in the direction indicated by an arrow Y in FIG. 4). In FIG. 4, the recording medium protection cover 203 is moved by a distance equivalent to that which the bearing (the long hole) 203a can be moved. At this time, the moving shaft 205a of the protection cover detection switch 205 is separated from the arm 203b of the recording medium protection cover 203, and is projected to the rear by the force exerted by a spring internally provided to a switch, so that the shifting of the recording medium protection cover 203 to the opening state is detected. In this state, a pawl 203c of the recording medium protection cover 203 is disengaged from a pawl receiver 201a in the camera main body 201, permitting the recording medium protection cover 203 to be rotated, relative to the camera main body 201, at the hinge shaft 204. Then, after the recording medium protection cover 203 is rotated to the position indicated by broken lines in FIG. 4, the recording medium card 206 can be removed from the card slot 207 by manipulating an eject button (not shown). As shown in FIG. 4, the recording medium card 206 is inserted into or removed from the card slot 207 in the direction indicated by a double headed arrow X.

With this structure, the open and closed positions of the recording medium protection cover 203 can be detected by the protection cover detection switch 17, and the supply of electric power to the internal memory can be controlled, which is the feature of the present invention.

A second embodiment of the present invention will now be described.

In the first embodiment, the operating member that may cause a user of the camera to perform an erroneous operation is explained as the recording medium protection cover 203, which covers the medium insertion slot of the recording medium chamber in which the external recording medium is stored. However, the recording medium protection cover 203 may be replaced by a battery cover that covers the insertion slot in a power source chamber wherein a power source is stored, and the switch 17 that detects the open/closed position of the recording medium protection cover 203 may be replaced by a switch 18 that detects the open/closed position of the battery cover.

Therefore, the detection of the open/closed position of the cover detection switch at steps S110 and S117 in the flowchart in FIG. 2 can be replaced by the detection of the open/closed position of the battery cover.

Figure 5:
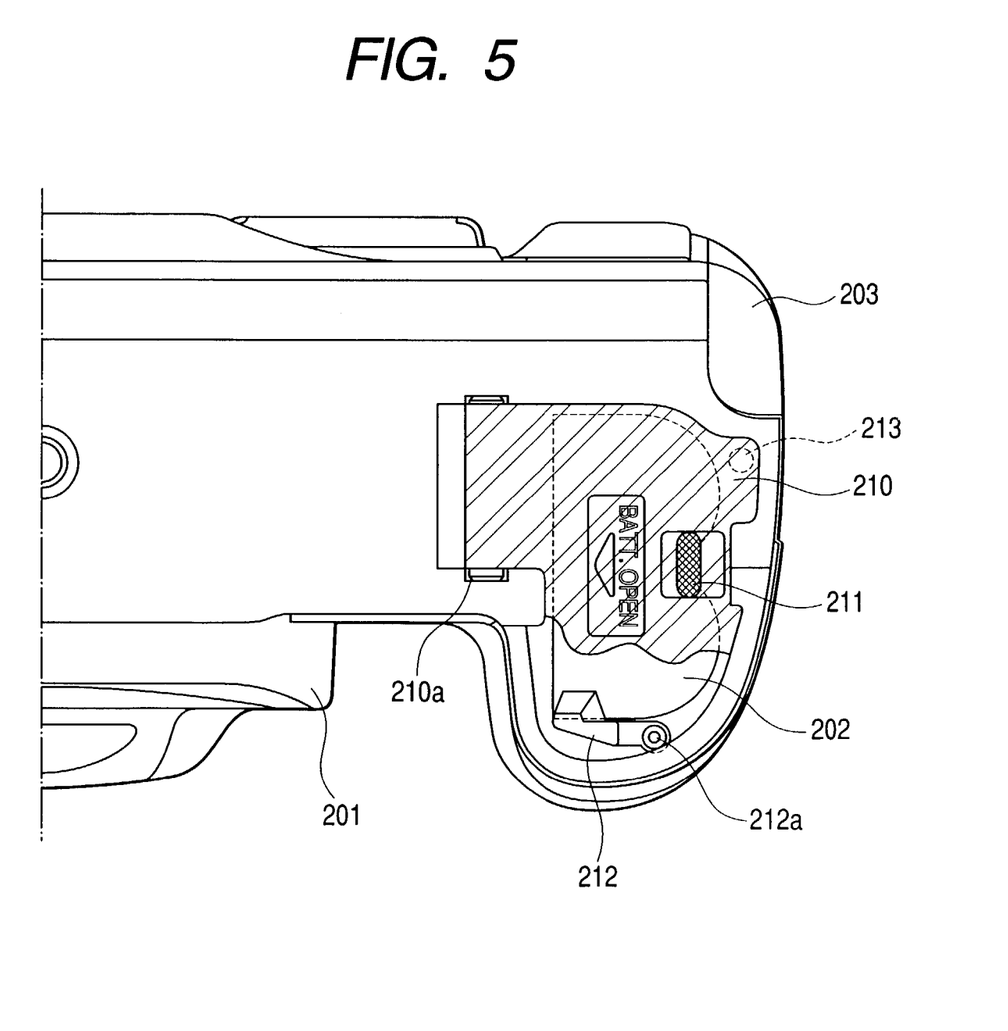
FIG. 5 is a bottom view of the right half of a digital still camera according to a second embodiment of the present invention.

In FIG. 5, a bottom view-of the digital still camera according to the present invention, the same reference numerals as are used in FIGS. 3 and 4 are again used to denote corresponding components. In FIG. 5, a battery cover 210 (the shaded portion) is partially exploded, so that the inside of the cover is visible. A battery 202, which is the same as the one in FIG. 3, is located in the open space within the grip of a camera main body 201, and is vertically detachable from the camera main body 201.

In FIG. 5, the battery cover 210, which is rotatably supported by a hinge 210a secured to the camera main body 201, is closed, and a latch disengagement button (a hatched portion) 211 is used to open the battery cover 210. When the latch disengagement button 211 is displaced to the left in FIG. 5, the latch of the closed battery cover 210 can be disengaged.

A battery lock lever 212 in FIG. 5 is supported rotatably to the camera main body 201 by a hinge 212a, and the distal end of the battery lock lever 212 overlaps part of the battery 202, thereby locking in the battery 202 in the detachment direction (vertically, relative to the camera), i.e., the battery 202 remained to be loaded even when the battery cover 210 is opened. A battery cover detection switch 213, the distal end of the moving shaft of which is indicated by a broken line, is used to detect the open and closed positions of the battery cover 210. This battery cover detection switch 213 is the same as the protection cover detection switch 205 in FIGS. 3 and 4, and is so located that the moving shaft is shifted perpendicular to the paper surface (vertically, relative to the camera). The battery cover detection switch 213 corresponds to the battery cover detection switch 18 in the block diagram in FIG. 1.

The operation to be performed to remove the battery 202 loaded in the camera main body 201 will now be described. To open the battery cover 210, first, the user of the camera moves the latch disengagement button 211 to disengage the latch of the battery cover 210 from the camera main body 201, and then rotate the battery cover 210 at the hinge 210a.

After the battery cover 210 is opened, the moving shaft of the battery detection switch 213, which was driven into the battery cover 210, is released, so that whether the battery cover 210 is open can be detected by the battery cover detection switch 13. At this time, a battery lock lever 212 prevents the immediate ejection of the battery 202, which is loaded so that it contacts the power source connections (not shown). Therefore, when the battery cover detection switch 213 detects the opening of the battery cover 202, the power source of the camera is maintained in the conductive state.

Next, the battery lock lever 212 in FIG. 5 is rotated counterclockwise until the distal end of the battery lock lever 212 is shifted away from the trajectory along which the battery 202 is to be removed (when the distal end of the battery lock lever 212 no longer overlaps the battery 202). As a result, removal of the battery 202 is possible.

With this arrangement, the open/closed position of the battery cover 210 can be detected by the battery cover detection switch 213, and the power control can be exercised for the internal memory 10, which is the subject of the present invention.

According to this embodiment, the battery cover detection switch 213 detects the position of the battery cover 210 as it is rotated and opened. However, the battery cover detection switch 213 may also be operated, by shifting the latch disengagement button 211, to detect that the opening state of the battery cover 210 is changed.

Furthermore, in the first embodiment, the switch 17 for detecting the open/closed position of the recording medium protection cover, and the switch 18 for detecting the open/closed position of the battery cover 210, may be monitored in parallel.

Another embodiment will now be described.

The scope of the present invention also includes an embodiment wherein, to implement the functions of the embodiments, software program code therefor is supplied to the computer (the CPU or the MPU) of an apparatus or a system connected to various devices, and these devices are operated in accordance with the program code that is stored in the computer of the system or of the apparatus.

In this case, the software program code itself implements the above embodiments, and the program code constitutes the present invention. A transmission medium for the program code can be a communication medium (a wired line, such as an optical fiber, or a wireless line) for a computer network (a LAN or a WAN, such as the Internet or a radio communication network) that serves as a carrier for the transmission of program information.

Further, means for supplying the program code to a computer, such as a recording medium to which the program code has been stored, constitutes the present invention. Such a recording medium for storing the program code can be, for example, a flexible disk, a hard disk, an optical disk, a magneto-optical disk, a CD-ROM, a magnetic tape, a non-volatile memory card or a ROM.

In addition, the present invention also includes program code such that the functions of the embodiments can be implemented, not only when the program code is executed by a computer, but also when the program code cooperates with the operating system (OS) or another application program run by the computer.

Moreover, a scope of the present invention also includes an embodiment wherein program code supplied to a computer is stored in a memory provided for the function extension board of the computer or for a function extension unit connected to the computer, and wherein, based on an instruction in the program code, a CPU provided for the function extension board or the function extension unit performs part or all of the actual processing required to implement the functions of the embodiments.

The shapes and structures of the individual sections in the embodiments are mere examples that can be used to implement the present invention, and the technical scope of the present invention should not limited to them; That is, the present invention can be variously implemented without departing from the spirit or the essential feature of the invention.

What is claimed is:

1. An image pickup apparatus comprising:
   an image pickup element;
   an internal memory for recording image data;
   a recorder configured to transfer externally the image data from said internal memory;
   an operating member for removing a battery;
   a detection switch configured and positioned to detect an operation of said operating member; and
   a controller configured to halt external transfer of image data by said recorder from said internal memory once external image transfer is started so that some image data remains in said internal memory, to hold image data remaining to be recorded externally in said internal memory, and to stop supplying electric power to an external device, as soon as the following two conditions occur:
   a) said recorder starts to externally transfer the image data but has not yet transferred all of the image data externally; and
   b) said detection switch detects the operation of said operating member.

2. An image pickup apparatus according to claim 1, wherein said internal memory comprises a volatile memory, and said controller maintains the powered state of said internal memory in order to hold the remaining image data.

3. An image pickup apparatus according to claim 1, wherein said operating member is a member to be manipulated by a user to remove the battery.

4. An image pickup apparatus according to claim 3, further comprising:
   warning means for issuing a warning to the user when said operating member is manipulated before all the image data are transferred externally from said internal memory.

5. An image pickup apparatus according to claim 3, wherein, when said operating member is returned to the original state, the transfer of the image data remaining in said internal memory is resumed.

6. An image data recording method comprising the steps of:
   recording into an internal memory image data obtained by an image pickup element;
   transferring externally the image data from the internal memory;
   detecting an operation of an operating member for removing a battery; and
   halting external transfer of image data by said transferring step from the internal memory once external image transfer is started so that some image data remains in the internal memory, holding image data remaining to be recorded externally in the internal memory, and stopping supply of electric power to an external device, as soon as the following two conditions occur:
   a) said transferring step starts to externally transfer the image data but has not yet transferred all of the image data externally; and
   b) said detecting step detects the operation of the operating member.

7. An image data recording method according to claim 6, wherein said transferring step further includes a step of:
   resuming the transfer externally of the image data remaining in the internal memory, in a case that the return of the operating member to an original state is detected.

8. A computer program embodied in a computer-readable medium, for implementing an image data recording method according to claim 6.

* * * * *

UNITED STATES PATENT AND TRADEMARK OFFICE
CERTIFICATE OF CORRECTION

| | | |
|---|---|---|
| PATENT NO. | : 7,324,140 B2 | Page 1 of 1 |
| APPLICATION NO. | : 10/400482 | |
| DATED | : January 29, 2008 | |
| INVENTOR(S) | : Hiroshi Kikuchi | |

It is certified that error appears in the above-identified patent and that said Letters Patent is hereby corrected as shown below:

COLUMN 3:
Line 54, "y" should read --$\gamma$--.

COLUMN 7:
Line 16, "fixed" should read --fixed to--.

Signed and Sealed this

Sixth Day of January, 2009

JON W. DUDAS
*Director of the United States Patent and Trademark Office*